I. G. PRIEST.
PHOTOMETRIC DEVICE.
APPLICATION FILED JUNE 20, 1913.
1,072,166.
Patented Sept. 2, 1913.
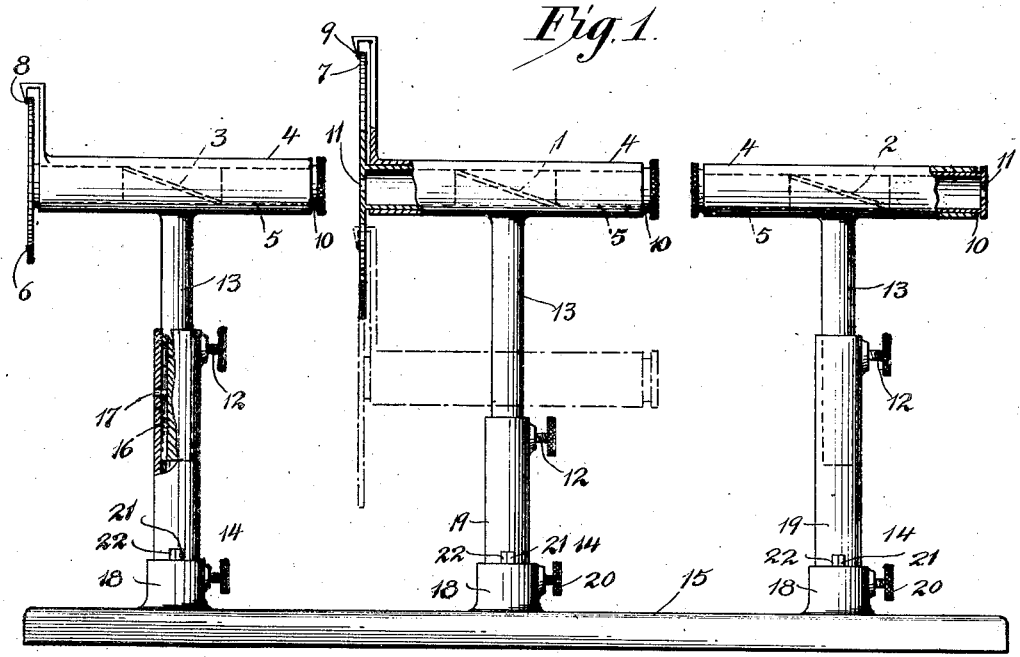
Fig. 1.
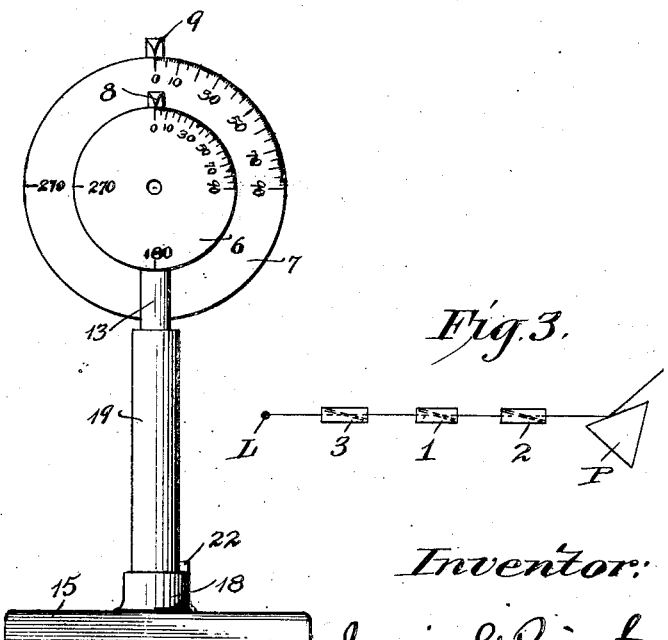
Fig. 2.
Fig. 3.
Witnesses:
Philip V. Wells
Clancy S. Peters
Inventor:
Irwin G. Priest

UNITED STATES PATENT OFFICE.

IRWIN G. PRIEST, OF WASHINGTON, DISTRICT OF COLUMBIA.

PHOTOMETRIC DEVICE.

1,072,166.  Specification of Letters Patent.  Patented Sept. 2, 1913.

Application filed June 20, 1913. Serial No. 774,938.

(DEDICATED TO THE PUBLIC.)

*To all whom it may concern:*

Be it known that I, IRWIN G. PRIEST, a citizen of the United States, and resident of Washington, District of Columbia, have invented a new and useful Improvement in Photometric Devices, and application for Letters Patent on said improvement is made under the act of Congress of March 3, 1883, chapter 143.

The invention herein described may be used by the United States Government, or any of its officers or employees in prosecution of work for the United States Government, or by any other person in the United States, without the payment to me of any royalty thereon.

The following description in connection with the accompanying drawings is a full, clear and exact specification of my improvement, such as will enable those skilled in the art to which it appertains to make and use the same.

My invention relates to an improvement in such photometric devices as employ a pair of Nicol prisms in association with other polarizing optical parts. In devices of this kind the ordinary law connecting the intensity and the angle between corresponding planes in the two nicols cannot be used as a formula for obtaining the intensity. An example of such a case occurs in the path of the beam of light passing through collimator B, Fig. 2, United States Patent No. 1,026,878. In this case intensity cannot be measured by the ordinary formula by rotating the analyzer, for the plane of polarization of the beam incident on the prism P is thus rotated and the intensity of the beam reflected from the prism is a function of the angle between the plane of incidence and the plane of polarization of the incident beam. The difficulty can be obviated by rotating the polarizer instead of the analyzer provided the beam incident on the polarizer is known to be completely unpolarized. It is in cases where this is not true that my proposed device is useful.

The object of my invention is, then, to provide a polarization device useful and convenient to make photometric measurements in all cases where the beam incident on the device is not completely unpolarized and at the same time there are other polarizing optical parts succeeding the device in the path of the light. To this end I use three Nicol prisms in train mounted in such a way that the principal planes of the two end nicols can be suitably fixed with reference to other optical parts preceding and succeeding the three nicols in the path of the light, while the principal plane of the middle nicol can be rotated with reference to these planes. The law relating the intensity of the light and the angles between the just mentioned principal planes can be definitely stated and used as a formula for measurements. In the preferred application of my invention the angle between the principal planes of the end nicols is zero and the intensity is proportional to the fourth power of the cosine of the angle between the principal plane of the middle nicol and the common principal plane of the other two.

To this and other ends the invention consists in certain improvements and combinations of parts all as will be hereinafter more fully described, the novel feature being pointed out in the claims at the end of the specification.

In the accompanying drawings Figure 1 is a side elevation; certain parts being broken away, and Fig. 2 is a front elevation of a preferred embodiment of my invention. Fig. 3 is a diagrammatic view showing my device as used in connection with a deflecting surface.

1, 2, and 3 represent three Nicol prisms adapted to be disposed in axial alinement with respect to each other. To conveniently support these Nicol prisms in operative position I have mounted each in a tube 5 as is customary in devices of this kind. The tubes 5 are journaled in larger tubes 4 and so associated therewith that they can be conveniently withdrawn, when desired. The tubes 4 are carried by posts 13 adapted for telescopic connection with hollow standards 14 which are preferably projecting from a base plate 15 so that the enumerated parts form a unitary structure. Tubes 13 and standards 14 are preferably provided with a groove and tongue connection to admit of a lowering and raising of the optical parts without disturbing their axial alinement. As shown at the left of Fig. 1 the standard 14 has along its bore a groove 16 and attached to the post 13 is a pin 17 adapted for free sliding movement in the groove 16. For the purpose of holding the post 13 in any desired position vertically of the standard 14

I have provided a set screw 12 carried by the standard 14 and adapted to impinge upon the post 13.

The standard 14 is preferably made in two parts, the lower part 18 having a cylindrical bore and the upper tubular member 19 adapted to be received in the bore and to be freely rotatable therein. A set screw 20 is employed to fix the parts 18 and 19 in any desired relative position. The parts 18 and 19 are suitably provided with abutments 21 and 22 to limit the rotative movement of the tubular member 19 and to constitute a ready means for adjusting the standards 14 together with the optical elements carried thereby to their operative position.

As seen from an inspection of Fig. 1, I have made the central standard shorter and the central post 13 longer than the end standards and posts. By this construction I am enabled to lower the elements carried thereby below the line of collimation so that the end Nicol prisms can be properly adjusted with respect to each other.

With the prisms 1 and 3 I have associated suitable scales for determining the relative movements thereof during the operation of the device. Scales 6 and 7 are connected to the inner tubes 5 carrying the prisms 3 and 1, respectively, and pointers 8 and 9 are attached on the outer tubes 4 to coöperate with the scales for the purpose specified. I have made scale 7 and pointer 9 of slightly larger dimension than scale 6 and pointer 8 to admit of a convenient reading of the scales from one point. The ends of tubes 5 opposite the scales I have provided with screw threads to receive collars 10. These collars have shoulders to abut against the tubes 4 and to prevent longitudinal motion of the inner tubes 5 relative to the outer tubes 4. The tube 5 carrying prism 2 is held in place by two collars 10 as shown in Fig. 1 and is normally held in fixed position with its principal plane normal to the base. The scales and collars have central apertures 11 for the passage of the light.

In Fig. 3 I have shown my device as used in connection with a reflecting surface similar to the arrangement in Fig. 2 of the Patent 1,026,878 above referred to. My device is, however, by no means limited to that particular application and the reflecting surface there shown is merely representative of such polarizing optical parts, of whatever character they may be, as affect the accuracy of photometric measurements as above pointed out.

The operation of my device is as follows: The middle prism 1 is lowered below the line of collimation of the other two prisms and the outer prisms 2 and 3 are angularly adjusted relative to each other to any desired angle by turning prism 3 and scale 6. Ordinarily I prefer to have prisms 2 and 3 so adjusted that their principal planes are in parallelism which position would be indicated by the indicator 8 on the scale 6 pointing to zero. After the prisms 2 and 3 are properly adjusted, prism 1 is raised and brought into alinement with prisms 2 and 3. In this position the device is ready for use. The intensity of a beam of light passing through the system is varied by turning the middle prism 1 and the angle of rotation of the middle prism with respect to the relatively fixed outer prisms is a criterion of the intensity of the delivered beam.

While I have shown and described a specific form of embodiment of my invention for the purpose of illustrating what I consider at present a preferred form, I do not wish to be limited to that particular form as it is obvious that my invention is susceptible of different forms of execution and such forms may vary to suit particular circumstances and conditions that might arise in the use of my device. It is furthermore to be understood that while I preferably dispose the two end nicols in parallelism any other intermediate angle between parallelism and crossed prisms may be used for the purposes for which the device is designed.

Having described my invention, what I claim as new and desire to secure by Letters Patent is:

1. In a device of the character described, the combination of three Nicol prisms, the outer members of which are relatively stationary and the inner member of which is rotatable.

2. In a device of the character described, the combination of three Nicol prisms, the outer members of which are provided with means for indicating and adjusting the angular relation of their principal planes and the inner member of which is rotatable.

3. In a device of the character described, the combination of three Nicol prisms, the outer members of which are provided with means for securing them in any desired angular relation with respect to their principal planes and the inner member of which is rotatable and means for indicating the angular relation of the principal plane thereof with respect to one of the outer prisms.

IRWIN G. PRIEST.

Witnesses:
PHILIP O. WELLS,
CHAUNCEY G. PETERS.